US010952462B2

(12) United States Patent
Gamberini et al.

(10) Patent No.: US 10,952,462 B2
(45) Date of Patent: Mar. 23, 2021

(54) METHOD AND KIT FOR ADJUSTING A MACHINE FOR WRAPPING OR PACKING ARTICLES

(71) Applicant: G.D S.p.A., Bologna (IT)

(72) Inventors: Giuliano Gamberini, Crevalcore (IT); Daniele Salvadeo, Monte San Pietro (IT); Alberto Dani, Bologna (IT); Massimo Sartoni, Bologna (IT); Luca Federici, Bologna (IT)

(73) Assignee: G.D S.P.A., Bologna (IT)

( * ) Notice: Subject to any disclaimer, the term of this patent is extended or adjusted under 35 U.S.C. 154(b) by 0 days.

(21) Appl. No.: 16/483,616

(22) PCT Filed: Feb. 21, 2018

(86) PCT No.: PCT/IB2018/051052
§ 371 (c)(1),
(2) Date: Aug. 5, 2019

(87) PCT Pub. No.: WO2018/158655
PCT Pub. Date: Sep. 7, 2018

(65) Prior Publication Data
US 2020/0120973 A1    Apr. 23, 2020

(30) Foreign Application Priority Data
Feb. 28, 2017 (IT) .................. 102017000022610

(51) Int. Cl.
*A24C 5/32* (2006.01)
*B65G 43/10* (2006.01)
(Continued)

(52) U.S. Cl.
CPC ............. *A24C 5/327* (2013.01); *A24C 5/478* (2013.01); *B65G 43/10* (2013.01); *B65G 47/848* (2013.01);
(Continued)

(58) Field of Classification Search
CPC ......... A24C 5/327; A24C 5/336; A24C 5/478; B65G 43/10; B65G 47/848; B65G 2201/0226; B65G 2203/042
See application file for complete search history.

(56) References Cited

U.S. PATENT DOCUMENTS 5,163,336 A * 11/1992 Biondetti ................ B06B 1/162
74/61
6,544,157 B1 * 4/2003 Spatafora ............... A24C 5/327
492/15

FOREIGN PATENT DOCUMENTS

CN          203199759 U     9/2013
CN          103635105 A     3/2014
(Continued)

OTHER PUBLICATIONS

International Search Report and Written Opinion dated Jun. 1, 2018 for counterpart International Application No. PCT/IB2018/051052.
(Continued)

*Primary Examiner* — Gene O Crawford
*Assistant Examiner* — Lester Rushin, III
(74) *Attorney, Agent, or Firm* — Shuttleworth & Ingersoll, PLC; Timothy Klima

(57) ABSTRACT

A method and a kit for adjusting a machine for wrapping or packing articles, including a conveyor associated with an electric motor where, in an operating condition, the motor drives the conveyor in rotation about its axis of rotation. The method includes associating the conveyor with a reference integral with the conveyor and disposed at an angular position about its axis of rotation; detecting the angular position of the conveyor relative to the force of gravity by measuring the angle between a radial line passing through the reference and the force of gravity; detecting the angular position of the axis of the motor relative to a zero reference associated with an angular position transducer of the motor;
(Continued)

calculating and storing the angular displacement between the angular positions of the motor and the conveyor corresponding to the angular displacement between the zero reference and the force of gravity.

12 Claims, 2 Drawing Sheets

(51) Int. Cl.
  *B65G 47/84* (2006.01)
  *A24C 5/47* (2006.01)
(52) U.S. Cl.
  CPC .............. *B65G 2201/0226* (2013.01); *B65G 2203/0283* (2013.01); *B65G 2203/042* (2013.01)

(56) References Cited

FOREIGN PATENT DOCUMENTS

| | | |
|---|---|---|
| DE | 102011006121 A1 | 9/2012 |
| EP | 1472937 A2 | 11/2004 |
| FR | 2119438 A5 | 8/1972 |
| GB | 367431 A | 2/1932 |
| TW | I400188 B | 7/2013 |
| WO | 2014064613 A1 | 5/2014 |

OTHER PUBLICATIONS

Chinese Office Action dated Jul. 6, 2020 from counterpart Chinese Patent Application No. 201880014339.3.

* cited by examiner

METHOD AND KIT FOR ADJUSTING A MACHINE FOR WRAPPING OR PACKING ARTICLES

This application is the National Phase of International Application PCT/I62018/051052 filed Feb. 21, 2018 which designated the U.S.

This application claims priority to Italian Patent Application No. 102017000022610 filed Feb. 28, 2017, which application is incorporated by reference herein.

TECHNICAL FIELD

This invention relates to a method and a kit for adjusting a machine for wrapping or packing articles.

According to a possible embodiment of it, this invention relates to the sector of machines for wrapping or packing rod-shaped smoking articles to which this specification expressly refers but without losing in generality.

The term "rod-shaped smoking articles" is used to denote a plurality of products or smoking articles such as, for example, cigarettes, cigars, cigarillos, electronic cigarettes and the like, as well as the components making them up.

BACKGROUND ART

These machines generally comprise a plurality of conveyors or rollers configured to rotate about a respective axis of rotation to perform one or more operations on the smoking articles.

Some of the rollers of wrapping or packing machines are transfer rollers configured in such a way as to transfer the smoking articles along the machine itself from one wrapping or packing station to another. Besides transferring, the transfer rollers may also be configured to perform one or more wrapping or packing operations on the smoking articles. For example, each transfer roller is provided, on the radially external surface of it, with a plurality of flutes configured to receive the rod-shaped smoking articles. Preferably, the flutes are elongate in the axial direction of the transfer roller so as to receive the smoking articles disposed parallel to the axis of rotation of the roller. Also, the flutes are distributed circumferentially and usually equispaced along the radially external surface of the transfer roller. Still more preferably, the flutes are of the suction type, that is to say, they are in communication with a suction system adapted to hold the smoking articles in place.

Some of the rollers of the wrapping or packing machines are working rollers configured to perform one or more wrapping or packing operations on the smoking articles and/or on the components of the smoking articles. For example, in the sector of smoking articles, there may be rollers for cutting, rollers for applying plug wraps or the like.

In current machines for wrapping or packing smoking articles, an electric motor is associated with each roller or with a plurality of rollers mechanically linked to each other to drive them in rotation about their axes of rotation. The motors associated with the rollers are driven by electrical coupling according to a succession of angular positions linked to each other.

This type of drive has created the need to adjust the relative angular positions of the rollers before starting the machine in order to obtain an initial configuration where all the rollers are in phase, thus ensuring that the smoking articles are handled and/or transferred in a steady and reliable manner.

Up to now, this need has been met using templates or frames. Each template has a profile which is shaped in such a way as to receive two or more machine rollers and to set the rollers at a mutual angular position corresponding to the initial (or zero) angular position. For this purpose, each roller has a reference element—for example, a reference pin—which must be correctly positioned in the template profile to determine the mutual angular position of the two or more rollers. The machine rollers are adjusted manually group by group, using a plurality of templates until the mutual angular position of all the rollers has been adjusted.

Each machine therefore requires a plurality of templates. These templates must be suitably stored and then placed on the rollers before the machine is started. The templates therefore require storage space and skilled labour when used. This drawback is further worsened by the fact that each machine generally has its own specific set of templates which differs from that of other machines, however similar.

Moreover, with reference in general to any type of wrapping or packing machine where one electric motor is associated with one load, the Applicant has observed that the need to easily and reliably correlate the angular position of the motor (as indicated by the respective encoder) with the angular position of the load (substantially represented by the roller in the case of machines for the tobacco industry) remains an open problem. Indeed, such a correlation may need to be carried out at different times in the life of the machine: during initial setup, when the motors are physically connected to the respective loads; after any change made during operation; or when a motor is replaced.

AIM OF THE INVENTION

In this context, the technical purpose which forms the basis of the present invention is to propose a method and a kit for adjusting a machine for wrapping or packing articles to overcome at least some of the above mentioned disadvantages of the prior art and to meet the above mentioned requirements.

More specifically, this invention has for an aim to provide a method and a kit for adjusting a machine for wrapping or packing articles, allowing the machine to be set up easily, quickly and reliably and minimizing the number and size of the tools needed.

The technical purpose indicated and the aims specified are substantially achieved by a method and a kit for adjusting a machine for wrapping or packing articles comprising technical features as disclosed herein. The disclosure also provides possible different embodiments of the invention.

More specifically, this aim is achieved by correlating the angular position of the motor with the angular position of its conveyor or roller, thus making it possible to know the exact angular position of each conveyor or roller by knowing the angular position of the respective motor read by the angular position transducer or encoder of the motor itself.

Further features of the invention and its advantages are more apparent in the following non-limiting description, with reference to a preferred but non-exclusive embodiment of a method and a kit for adjusting a machine for wrapping or packing articles.

BRIEF DESCRIPTION OF THE DRAWINGS

The description is set out below with reference to the accompanying drawings which are provided solely for purposes of illustration without restricting the scope of the invention and in which.

DETAILED DESCRIPTION OF PREFERRED EMBODIMENTS OF THE INVENTION

Figure 1:
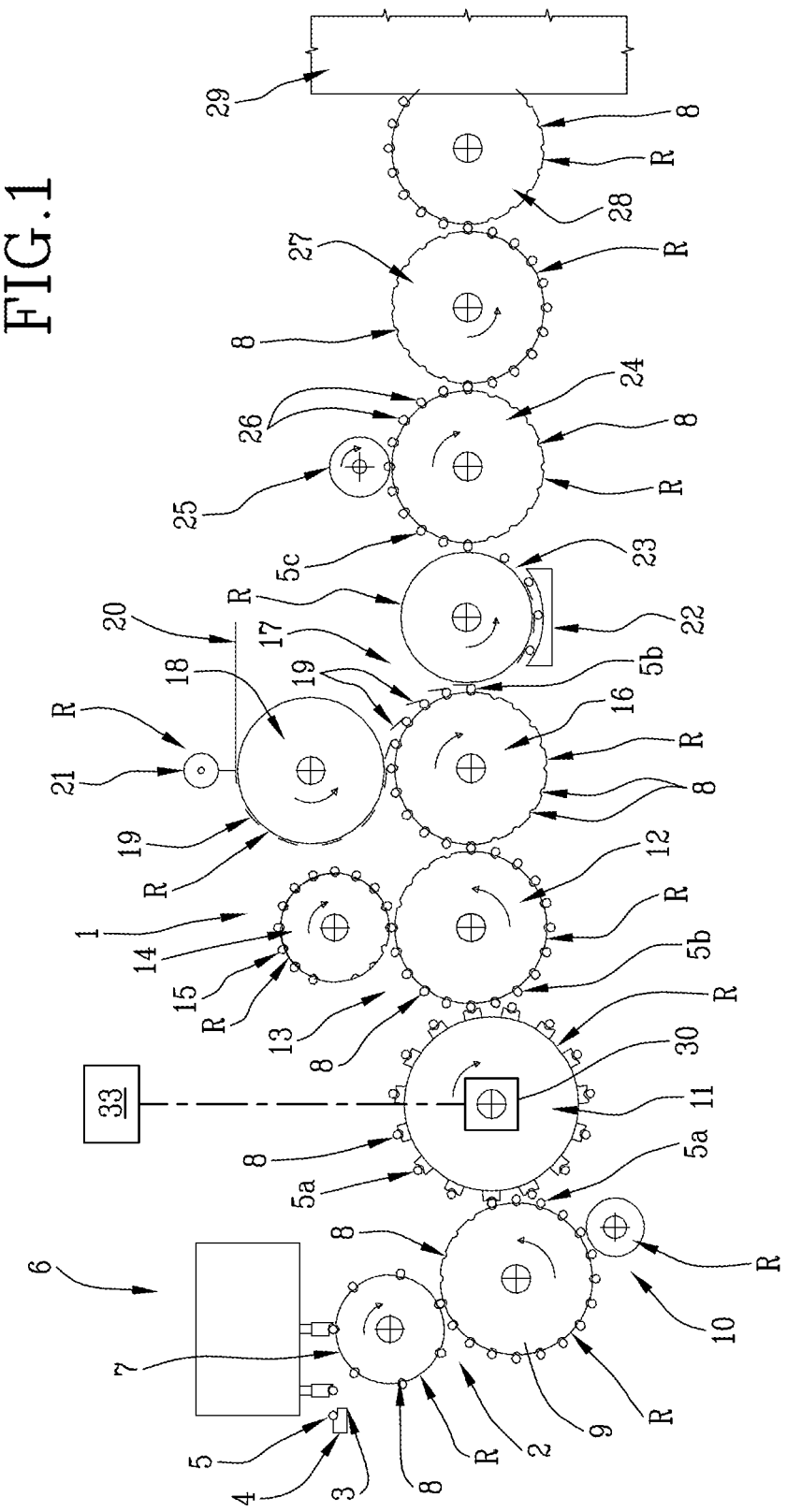
FIG. 1 shows a schematic front view of a filter cigarette making machine to which a method and kit according to this invention are applicable.

With reference to FIG. 1, the numeral 1 denotes in its entirety a machine for making filter cigarettes, also known as filter tip attachment machine, according to one possible embodiment.

This machine is an example of an application of this invention which can be applied to any type of machine for the wrapping or packing of articles. Hereinafter in this description, reference is made, for convenience, to cigarettes as a specific example of "articles" and, in particular, of "rod-shaped smoking articles" as defined above.

The machine 1 comprises a sequence of conveyors such as, for example, rollers mounted on shafts which are parallel to each other, specifically horizontal shafts. Reference to rollers hereinafter in this description shall be understood to mean conveyors of any kind, including belts, chains, carousels, etc.

An entrance 2 of the machine 1 is coupled to an exit 3 of a forming beam 4 for forming a succession of double-length cigarette segments 5 which are transferred in succession by a transfer unit 6 from the beam 4 to the entrance 2 of the machine 1, defined by a first roller 7.

Hereinafter in this description, these rollers, which constitute conveyors of the articles are also denoted generically by the reference character "R", for convenience. Each of the rollers "R" is provided, on its radially external surface, with a plurality of suction flutes 8 parallel to the axis of rotation of the roller.

The first roller 7 rotates, clockwise looking at FIG. 1, at a constant angular speed about its axis, which is parallel to the longitudinal axis of extension of the beam 4, and after receiving the double length segments 5, feeds the double segments 5 transversely to their axes and transfers them in succession to respective flutes 8 formed on the periphery of a second roller 9, which rotates anticlockwise looking at FIG. 1.

The roller 9 feeds the double segments 5 transversely to their axes through a cutting unit 10, which divides each double length segment 5 into a pair of single-length segments 5a equal to a cigarette in length, and transfers the single-length segments, axially aligned with each other, into the flutes 8 of a third roller 11, which rotates clockwise and axially spaces the two segments 5a from each other.

After being spaced apart, the two segments 5a are transferred to a fourth roller 12 forming part of an assembly unit 13 which also comprises a feed roller 14 for feeding double-length filters 15. As illustrated in FIG. 1, the roller 14 is mounted substantially tangent to the roller 12 to rotate about its axis in the direction opposite to that of the roller 12 at the same peripheral speed, and is adapted to feed each double-length filter 15 to a central portion of the respective flute 8. That way, after being fed into the flute 8, each double filter 15 is aligned between two segments 5a fed to the same flute 8 to form on the same roller 12 a group 5b consisting of two coaxial segments 5a separated by a double filter 15. The groups 5b are fed in succession by the roller 12 to a fifth roller 16 at the entrance to a finishing unit 17.

In addition to the roller 16, the unit 17 comprises a roller 18 for feeding plug wraps 19 obtained from a continuous web 20 by a cutting unit 21 and each used to join to each other the segments 5a and the double filter 15 of each group 5b. The finishing unit 17 also comprises a rolling unit 22 comprising a respective roller 23 and adapted to receive in succession the groups 5b and the related plug wraps 19 from the fifth roller 16, and to roll each plug wrap 19 round the respective double filter 15 and round the end portions of the related segments 5a abutting it to obtain a double cigarette 5c. The roller 23 feeds the double cigarettes 5c in succession to a sixth roller 24 at the exit of the finishing unit 17.

While in the flutes 8 of the roller 24, the double-length filters 15 of the double cigarettes 5c are brought into contact with a cutting unit 25 to obtain coaxial pairs of cigarettes 26 which are fed by the roller 24 to further rollers 27 and 28 which in turn feed the cigarettes 26 to further operating units forming part of the filter tip attachment machine and represented schematically as a block 29. At the further operating units, the cigarettes 26 are arranged in a single row.

The machine 1 comprises a plurality of electric motors, not illustrated, which drive the rollers "R" in rotation. More specifically, an electric motor is associated with one or more rollers "R" in such a way as to drive them in rotation about respective axes of rotation. Each motor is provided with an angular position transducer—for example, an encoder—which defines a zero reference "A" relative to which it is possible to know the angular position α of the electric motor shaft.

During normal operation of the machine 1, all the rollers described above rotate at very high speeds to transfer and/or handle cigarettes (smoking articles) and/or components of the cigarettes. To perform these operations correctly and reliably, the angular positions of all the rollers must be controlled during the machine's entire operating cycle, starting from the zero angular position, which is set at the adjustment stage.

In use, the motors associated with each roller "R" are driven by electrical coupling according to a succession of angular positions linked to each other starting from a zero angular position of each roller such that the plurality of rollers is in phase, that is to say positioned relatively in such a way as to correctly transfer and/or handle the smoking articles and/or the smoking article components.

The angular position of a roller is defined by the angular position where a radial straight line 31 integral with the roller is positioned at an angular distance relative to the direction of the force of gravity "G" equal to a given zero angle β. The term "radial straight line" is used to mean a straight line perpendicular to the axis of rotation of the roller and incident to it. Hereinafter, reference to the force of gravity shall be understood as the reference to its direction, which is oriented towards the centre of the Earth.

Figure 2:
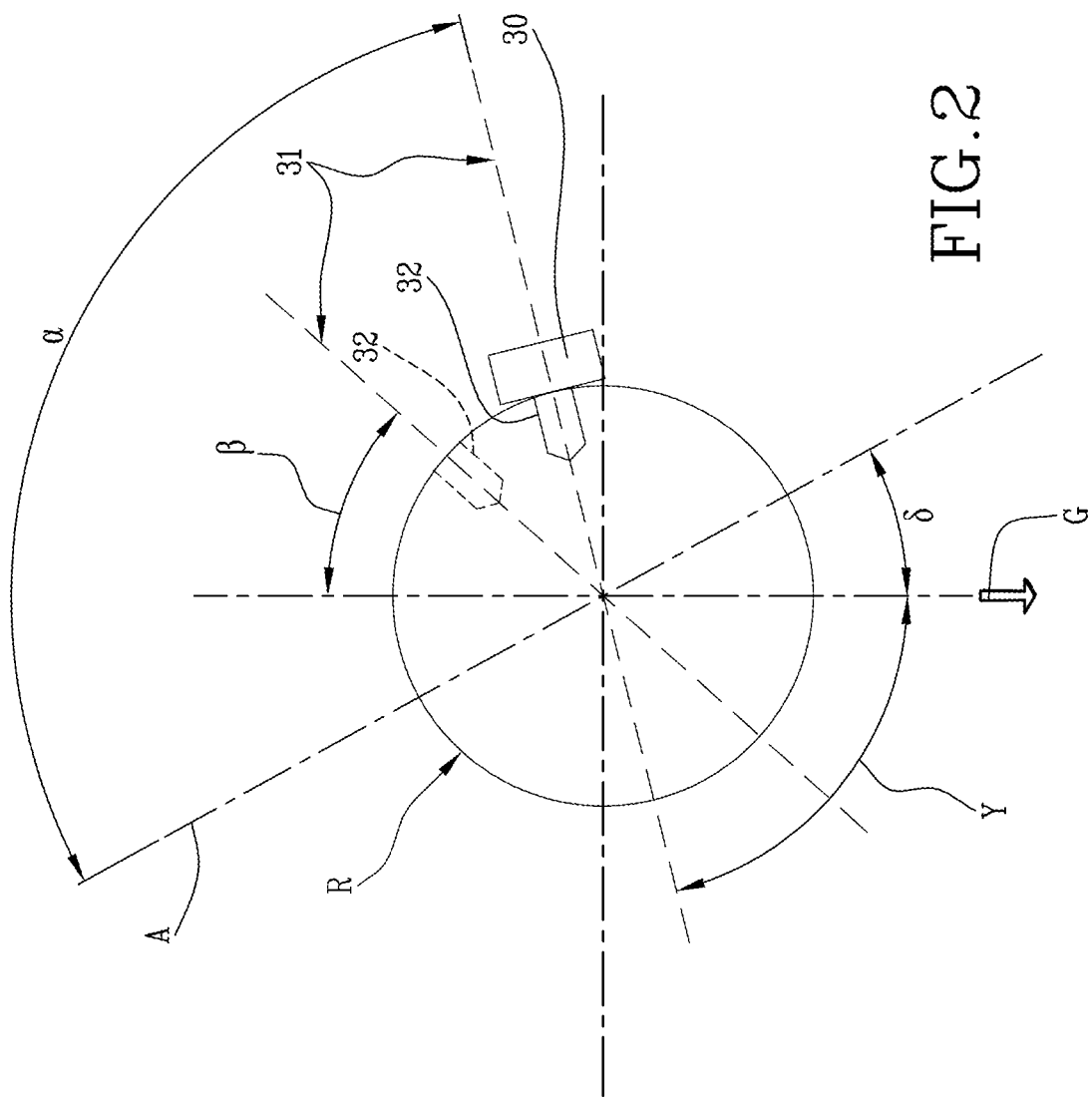
FIG. 2 schematically illustrates a step in the adjustment of a wrapping or packing machine according to this invention.

As illustrated, for example, in FIG. 2, the radial straight line 31 may be defined by the radial direction passing through a reference 32 of the roller. The reference 32 may, for example, be embodied physically by a cavity or a pin or it may be represented by a data item stored in a control unit of the machine. Alternatively, the radial straight line 31 may be recognizable in that it is defined by the radial direction disposed at a given angular distance from the reference 32.

In FIG. 2, the position of the roller "R" where the reference 32 is illustrated with the dashed line corresponds to the zero angular position β.

During initial setup of the machine, that is to say, when the motors are physically connected to the respective loads or following any change made as a result, for example, of a motor being replaced, the angular position γ of a roller is correlated with the angular position α of the electric motor. For this purpose, the roller "R" is operatively associated with its electric motor and held stationary with the reference 32 disposed at any angular position around the axis of rotation of the roller itself.

Next, the angular position γ of the conveyor or roller "R" relative to the force of gravity "G" is detected by measuring the angle between the radial straight line 31 passing through the reference 32 and the force of gravity "G".

The encoder associated with the electric motor provides the angular position α of the axis of the electric motor relative to the zero reference.

By calculating and storing the angular displacement δ between the angular position α of the electric motor and the angular position γ of the conveyor or roller "R" it is also possible to obtain the angular displacement between the zero reference "A" and the force of gravity "G".

This operation may be performed for each roller if the machine is being set up or for one or more rollers if the correlation between the angular position α of the electric motor and the angular position γ of the conveyor or roller "R" has been lost.

Knowing the angular displacement δ allows setting the rollers "R" in phase with each other. In other words, if the rollers are disposed at angular positions different from the respective initial angular positions, that is to say if the angular position γ is, as in FIG. 2, different from the zero angular position β, the roller "R" can be rotated about its axis until it returns to the zero angular position.

In one possible embodiment, adjusting the machine comprises uniquely placing an inclination sensor 30, or electronic level, on each roller "R", preferably one roller "R" at a time, and detecting the angular position γ of the roller using the inclination sensor.

Schematically shown in FIG. 1 is an inclination sensor 30 which can be associated with one of the rollers "R" of the machine 1 during setup, that is to say, when all the rollers "R" are stationary.

The inclination sensor 30 is configured and/or programmed to detect the angular distance between the radial straight line 31 and the force of gravity "G".

Preferably, the inclination sensor 30 is coupled to a roller to detect the angular position of the roller and the inclination sensor is uncoupled from the roller before starting the motors. In other words, during normal operation, there is no inclination sensor 30 associated with the rollers of the machine 1. The inclination sensor 30 is thus supplied as an external accessory of the machine 1 to be used only during setup.

When coupling the inclination sensor 30 to the roller, a reference of the inclination sensor is associated, preferably aligned, with the radial straight line 31.

Preferably, detecting the angular position γ is repeated for each roller using the same inclination sensor 30, coupling it to, and uncoupling it from, one roller at a time. In other words, a single inclination sensor can be used to detect the angular positions of all the machine rollers.

Alternatively, the machine 1 may be provided with an inclination sensor 30 for each roller and preferably each inclination sensor is constantly coupled to the respective roller.

The measured data relating to the angular position γ can be sent to a control unit 33 of the machine through a wired or wireless connection suitably established between the inclination sensor 30 and the control unit 33.

The control unit 33 obtains the angular position α from the encoder associated with the electric motor and correlates it with the angular position γ of the conveyor or roller associated therewith, measured relative to the force of gravity. In other words, the inclination sensor 30 transmits the angular position of each roller to the control unit 33 to enable the control unit 33 to calculate the angular displacement δ and thus detect the real position of the roller.

The method described above can be applied to all the rollers of a wrapping or packing machine, specifically to the transfer rollers, that is to say, to the rollers which are each provided, on their radially external surfaces, with a plurality of flutes configured to receive the rod-shaped smoking articles. The method described above can also be applied to what are known as working rollers, that is, rollers configured to perform one or more wrapping or packing operations on the smoking articles and or on components of the smoking articles.

This invention is characterized by using at least one inclination sensor configured and/or programmed to measure the angular positions of the rollers relative to the force of gravity "G" in a method for adjusting a machine for the wrapping or packing of articles, specifically rod-shaped smoking articles.

Preferably, the inclination sensor operates according to the microelectromechanical system (MEMS). Still more preferably, the inclination sensor is a single-axis or multi-axis sensor which measures inclination relative to an axis.

To adjust a machine for wrapping or packing articles, a kit may advantageously be provided which comprises at least one inclination sensor configured, together with the machine rollers, in such a way that it can be uniquely positioned on the roller to measure the angular position of the roller. For example, a shape fit obtained using the reference 32 may be provided.

Inclination sensors are currently used for applications different from the one described above: for example in anti-rollover systems for cranes, platforms or agricultural machines, or in platform levelling systems.

In a wrapping or packing machine according to this invention, the inclination sensor allows precisely measuring inclination relative to the vertical (local gravity vector) or relative to the horizontal.

In one possible embodiment, these sensors may be equipped with an eccentric seismic mass or pendulum whose movement, proportional to inclination, can be detected by optical, capacitive, inductive or electronic means.

In a different embodiment, these sensors may operate according to the microelectromechanical system (MEMS) or the micromechanical mass-spring system which measures the capacitance variation between a fixed electrode and a movable electrode finger-coupled to each other.

With the proposed solution, the angular position of each roller is detected on the basis of measurements performed by a high-precision electronic device (electronic level) mountable (or pre-mounted) uniquely on each roller. This dispenses with the need to connect two or more rollers to each other, as occurs at present using templates.

Adjustment can thus be carried out with a simple set of instruments and a limited number of devices, through easy, guided procedures capable of creating absolute references for the rollers without having to lock them at fixed absolute positions.

The possibility of using a wired or wireless connection can further simplify the procedure.

It should be noted that the method can also be used in machines for wrapping or packing different articles such as, for example, those of the confectionery industry (sweets, chocolates, etc.), of the chemical industry (soaps, detergents, oils, etc.), of the pharmaceutical industry (capsules, tablets, blisters, vials, etc.) and of the food industry in general (coffee, tea, pasta, beverages, etc.).

Compared to the templates of the prior art, the method of this invention allows detecting the angular position of the rollers and correlating it with the angular position of the motor. Furthermore, the method of this invention can allow correcting the position of the rollers so they are all in perfect synchrony. Correction can also be carried out manually with the machine stationary: thus, before starting the machine or during startup, each roller is checked to ensure it is in the correct position and, if necessary, the roller can be moved or accelerated to correct its position.

The invention claimed is:

1. A method for preparing for adjusting a machine for wrapping or packing articles, comprising:
    providing that the machine comprises a conveyor or roller operatively associated with an electric motor where, in a machine operating condition, the electric motor is adapted to drive the conveyor or roller in rotation about an axis of rotation,
    associating the conveyor or roller with a reference integral with the conveyor or roller at a certain angular position,
    detecting the angular position of the conveyor or roller relative to a force of gravity by measuring an angle between a radial straight line passing through the reference and the force of gravity,
    detecting the angular position of an the electric motor relative to a zero reference associated with an angular position transducer of the electric motor,
    calculating and storing an angular displacement between the angular position of the electric motor and the angular position of the conveyor or roller corresponding to the angular displacement between the zero reference and the force of gravity.

2. The method according to claim 1, and further comprising providing an inclination sensor configured and/or programmed to measure the angle between the radial straight line and the force of gravity, and detecting the angular position of the conveyor or roller via the inclination sensor.

3. The method according to claim 2, and further comprising coupling the inclination sensor to the conveyor or roller to detect the angular position thereof and uncoupling the inclination sensor from the conveyor or roller before starting the electric motor.

4. The method according to claim 3, wherein the coupling the inclination sensor to the conveyor or roller comprises aligning a reference of the inclination sensor with the radial straight line of the conveyor or roller.

5. The method according to claim 4, wherein the coupling the inclination sensor to the conveyor or roller comprises uniquely positioning the inclination sensor on the conveyor or roller.

6. The method according to claim 3, and further comprising:
    providing the machine with a plurality of electric motors, each of the plurality of electric motors being operatively associated with one or more conveyors or rollers,
    repeating the step of detecting the angular position of the conveyor or roller relative to the force of gravity using the same inclination sensor, and coupling and uncoupling the inclination sensor to one conveyor or roller at a time.

7. The method according to claim 2, and further comprising providing a plurality of conveyors or rollers and providing an inclination sensor for each of the plurality of conveyors or rollers with each inclination sensor being constantly coupled to a respective one of the conveyors rollers.

8. The method according to claim 2, and further comprising providing a wired or wireless connection between the inclination sensor and a control unit of the machine and sending through the wired or wireless connection to the control unit the detected angular position of the conveyor or roller relative to the force of gravity.

9. The method according to claim 2, and further comprising providing that the inclination sensor operates according to a micro electro-mechanical system.

10. The method according to claim 1, and further comprising:
    providing that the machine comprises a plurality of electric motors, each of the plurality of electric motors being operatively associated with one or more conveyors or rollers, the plurality of electric motors being adapted to be driven by electrical coupling according to a succession of angular positions linked to each other starting from a zero angular position of each conveyor or roller such that the plurality of conveyors or rollers is in phase,
    returning the corresponding conveyors or rollers to the zero angular position when the detected angular position is different from the zero angular position.

11. A kit for adjusting a machine for wrapping or packing articles, the machine comprising a conveyor or roller operatively associated with an electric motor where, in a machine operating condition, the electric motor is adapted to drive the conveyor or roller in rotation about an axis of rotation, the kit comprising:
    a micro electro-mechanical system (MEMS) inclination sensor configured and/or programmed to measure an angle made between a reference which is integral with the conveyor or roller and a force of gravity by detecting an angular position of the conveyor or roller relative to the force of gravity, the inclination sensor and the conveyor or roller being configured such that the inclination sensor can be coupled to the conveyor or roller only in a predetermined position and orientation to measure the angular position thereof.

12. The method according to claim 4, wherein the coupling the inclination sensor to the conveyor or roller comprises uniquely positioning the inclination sensor on the conveyor or roller at the reference.

* * * * *